(12) United States Patent
Silverman et al.

(10) Patent No.: US 7,736,532 B2
(45) Date of Patent: *Jun. 15, 2010

(54) COMPOSITION FOR REDUCING THE TRANSMISSION OF INFRARED RADIATION

(75) Inventors: Lee A. Silverman, Newark, DE (US); Marc B. Goldfinger, West Chester, PA (US); Richard A. Hayes, Brentwood, TN (US); Mark E. Lewittes, Wilmington, DE (US); Wayne E. Marsh, Bear, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/441,900

(22) Filed: May 26, 2006

(65) Prior Publication Data

US 2007/0152188 A1 Jul. 5, 2007

Related U.S. Application Data

(60) Provisional application No. 60/754,846, filed on Dec. 29, 2005.

(51) Int. Cl.
*C09K 19/00* (2006.01)
*C09K 19/06* (2006.01)
*C09K 19/52* (2006.01)
*F21V 9/04* (2006.01)
*G02F 1/03* (2006.01)

(52) U.S. Cl. ............... 252/299.01; 252/299.5; 252/587; 430/20; 430/270.1; 428/1.1; 359/244

(58) Field of Classification Search ............ 252/299.01, 252/299.5, 587; 428/1.1; 430/20, 270.1; 359/244
See application file for complete search history.

(56) References Cited

U.S. PATENT DOCUMENTS

| | | | |
|---|---|---|---|
| 3,679,290 A | 7/1972 | Adams et al. | |
| 3,711,181 A | 1/1973 | Adams, Jr. et al. | |
| 4,412,059 A | 10/1983 | Krigbaum et al. | |
| 4,614,619 A | 9/1986 | Shannon | |
| 4,637,896 A | 1/1987 | Shannon | |
| 4,749,261 A | 6/1988 | McLaughlin | |
| 4,786,148 A | 11/1988 | Sekimura | |
| 4,898,786 A | 2/1990 | Swofford | |
| 4,973,511 A | 11/1990 | Farmer | |
| 4,983,479 A | 1/1991 | Broer et al. | |
| 5,016,985 A | 5/1991 | Kalmanash | |
| 5,024,850 A | 6/1991 | Broer et al. | |
| 5,024,895 A | 6/1991 | Kavanagh | |
| 5,064,722 A | 11/1991 | Swofford | |
| 5,082,738 A | 1/1992 | Swofford | |
| 5,145,746 A | 9/1992 | Tomoyuki | |
| 5,356,966 A | 10/1994 | Nesvadba | |
| 5,367,008 A | 11/1994 | Nesvadba | |
| 5,369,159 A | 11/1994 | Nesvadba | |
| 5,428,162 A | 6/1995 | Nesvadba | |
| 5,428,177 A | 6/1995 | Nesvadba | |
| 5,488,117 A | 1/1996 | Nesvadba | |
| 5,506,704 A | 4/1996 | Broer et al. | |
| 5,529,817 A | 6/1996 | Smith, Jr. et al. | |
| 5,599,478 A | 2/1997 | Matumoto et al. | |
| 5,731,886 A | 3/1998 | Taber et al. | |
| 5,757,564 A | 5/1998 | Cross | |
| 5,780,629 A | 7/1998 | Etzbach | |
| 5,788,880 A | 8/1998 | Schierlinger | |
| 5,793,456 A | 8/1998 | Broer et al. | |
| 5,833,880 A | 11/1998 | Siemensmeyer et al. | |
| 5,886,075 A | 3/1999 | Keane | |
| 5,908,674 A | 6/1999 | Schindler | |
| 5,940,150 A | 8/1999 | Faris | |
| 6,055,088 A | 4/2000 | Fix et al. | |
| 6,060,042 A | 5/2000 | Schuhmacher | |
| 6,252,788 B1 | 6/2001 | Maesako et al. | |
| 6,259,559 B1 | 7/2001 | Kobayashi | |
| 6,391,400 B1 | 5/2002 | Russell | |
| 6,417,902 B1 | 7/2002 | Greenfield et al. | |

(Continued)

FOREIGN PATENT DOCUMENTS

EP 734852 12/2002

(Continued)

OTHER PUBLICATIONS

K. Maeda et al., "A Novel TN-LCD Exhibiting Frequency-Modulation Response Fabricated by Doping NLC Decorated Pd Nano-Particles: FM TN-LCD", 2002 SID International Symposium Digest of Technical Papers, vol. 33/1, pp. 519-521.

(Continued)

*Primary Examiner*—Geraldina Visconti

(57) ABSTRACT

Provided is a composition comprising a nonmicellar twisted nematic liquid crystal having cholesteric near infrared-reflecting properties and at least one near infrared absorptive material. This composition reduces the transmission of near infrared radiation. The composition can be used as a layer, optionally in conjunction with polymeric films, polymeric sheets, rigid sheets, and the like, to form multilayer laminates. In some embodiments these multilayer laminates are useful as solar control windows or window films to reduce energy consumption necessary to cool the interior of a structure such as an automobile or building.

19 Claims, No Drawings

U.S. PATENT DOCUMENTS

| | | |
|---|---|---|
| 6,432,522 B1 | 8/2002 | Friedman et al. |
| 6,466,297 B1 | 10/2002 | Goulding et al. |
| 6,468,444 B1 | 10/2002 | Meyer |
| 6,486,928 B1 | 11/2002 | Lin et al. |
| 6,503,636 B1 | 1/2003 | Le Masson |
| 6,630,974 B2 | 10/2003 | Galabova et al. |
| 6,661,486 B1 | 12/2003 | Faris et al. |
| 6,710,823 B2 | 3/2004 | Faris et al. |
| 6,723,395 B2 | 4/2004 | May |
| 6,800,337 B1 | 10/2004 | Siemensmeyer et al. |
| 6,806,930 B2 | 10/2004 | Moia |
| 6,831,720 B2 | 12/2004 | Jiang et al. |
| 6,911,254 B2 | 6/2005 | Fisher |
| 7,022,259 B2 | 4/2006 | Lee |
| 7,098,359 B2 | 8/2006 | Wellinghoff |
| 7,160,611 B2 | 1/2007 | Banba |
| 2001/0046595 A1 | 11/2001 | Moran |
| 2002/0061395 A1 | 5/2002 | Moran |
| 2002/0113921 A1 | 8/2002 | Jiang et al. |
| 2003/0026922 A1 | 2/2003 | May |
| 2004/0095531 A1 | 5/2004 | Jiang et al. |
| 2004/0234778 A1 | 11/2004 | Fukatani et al. |
| 2005/0089692 A1 | 4/2005 | Anderson |
| 2005/0224754 A1 | 10/2005 | Hirai |
| 2007/0116945 A1* | 5/2007 | Goldfinger et al. .......... 428/323 |
| 2007/0152188 A1 | 7/2007 | Silverman |
| 2007/0154718 A1* | 7/2007 | Silverman et al. ........ 428/411.1 |
| 2007/0228326 A1 | 10/2007 | Goldfinger |
| 2007/0267599 A1 | 11/2007 | Goldfinger |
| 2009/0161061 A1 | 6/2009 | Qi |

FOREIGN PATENT DOCUMENTS

| | | |
|---|---|---|
| JP | 04-281403 | 10/1992 |
| JP | 2000/122059 | 4/2000 |
| JP | 2005-031170 | 2/2005 |
| WO | WO 95/22586 | 8/1995 |
| WO | WO 95/24455 | 9/1995 |
| WO | WO 98/04651 | 2/1998 |
| WO | WO 98/44073 | 10/1998 |
| WO | WO 99/58334 | 11/1999 |
| WO | WO 01/60604 | 8/2001 |
| WO | WO 2005/103202 A2 | 11/2005 |
| WO | WO 2009/023759 | 2/2009 |
| WO | WO 2009/023762 | 2/2009 |

OTHER PUBLICATIONS

PCT International Search Report for International Application No. PCT/US2006/020656 dated Sep. 21, 2006.

U.S. Appl. No. 12/242,211, filed Sep. 30, 2008, Qi.

U.S. Appl. No. 12/480,022, filed Jun. 8, 2009, Goldfinger.

U.S. Appl. No. 12/480,033, filed Jun. 8, 2009, Goldfinger.

* cited by examiner

COMPOSITION FOR REDUCING THE TRANSMISSION OF INFRARED RADIATION

CROSS-REFERENCE TO RELATED APPLICATION

This application claims priority under 35 U.S.C. § 120 to U.S. Provisional Application No. 60/754,846, filed on Dec. 29, 2005, which is incorporated herein by reference in its entirety.

BACKGROUND OF THE INVENTION

Several patents and publications are cited in this description in order to more fully describe the state of the art to which this invention pertains. The entire disclosure of each of these patents and publications is incorporated by reference herein.

Glass laminated products have contributed to society for almost a century. Beyond the well known, every day automotive safety glass used in windshields, laminated glass is used as windows for trains, airplanes, ships, and nearly every other mode of transportation. Safety glass is characterized by high impact and penetration resistance and does not scatter glass shards and debris when shattered.

Safety glass typically consists of a sandwich of two glass sheets or panels bonded together with an interlayer of a polymeric film or sheet, which is placed between the two glass sheets. One or both of the glass sheets may be replaced with optically clear rigid polymeric sheets, such as sheets of polycarbonate materials. Safety glass has further evolved to include multiple layers of glass and polymeric sheets bonded together with interlayers of polymeric films or sheets.

A more recent trend has been the use of glass-laminated products in the construction of homes and office structures. The use of architectural glass has expanded rapidly over the years as designers incorporated more glass surfaces into buildings. Threat resistance has become an ever-increasing requirement for architectural glass laminated products. These newer products are designed to resist both natural and man-made disasters. Examples of these needs include the recent developments of hurricane resistant glass, now mandated in hurricane susceptible areas, theft resistant glazings, and the more recent blast resistant glass-laminated products designed to protect buildings and their occupants. Some of these products have great enough strength to resist intrusion even after the glass laminate has been broken. For example, when a glass laminate is subjected to high force winds and impacts of flying debris as occur in a hurricane or where there are repeated impacts on a window by a criminal attempting to break into a vehicle or structure.

Society continues to demand more functionality from laminated glass products beyond the safety characteristics described above. One area of need is to reduce the energy consumption within the structure, such as an automobile or building to which the laminated glass is applied. The sun's energy strikes the earth over a wide spectral range from 350 nm to 2,100 nm. Nearly half the energy is within the near infrared region of 750 nm to 2,100 nm. Removing the energy from the visible region would sacrifice visual transparency through windows and, therefore, detract from one of the advantages of windows. However, since the human eye does not sense the near infrared region, attempts have been made to prevent the transmission of the energy from the near infrared region through glass laminates by modifying the glass and/or the polymeric interlayer, by the addition of further layers or combinations thereof.

Liquid crystals are known to appear in many different forms, including the smectic, nematic and twisted nematic (or cholesteric or chiral nematic) forms. A comprehensive description of the structure of liquid crystals in general, and twisted nematic liquid crystals in particular is given in "The Physics of Liquid Crystals," P. G. de Gennes and J. Prost, Oxford University Press, 1995. Twisted nematic liquid crystalline materials are also disclosed in, for example; U.S. Pat. Nos. 3,679,290, 4,637,896, 6,300,454, 6,417,902 and 6,486,338 references disclosed therein. The chirality of the liquid crystalline material determines the existence of twisted nematic phases. The presence of a chiral moiety within the liquid crystalline material induces the existence of twisted nematic phases.

Liquid crystalline materials have been considered for use in glazings to control solar radiation. Devices that incorporate micellar liquid crystal materials (discrete particles of liquid crystal materials), within matrix materials generally exhibit haze at unacceptable levels for a transparent glazing. Continuous coatings and films of liquid crystalline materials (nonmicellar liquid crystalline materials), have been disclosed in U.S. Pat. Nos. 3,679,290; 5,731,886; 5,506,704; 5,793,456; 6,831,720; 6,630,974; 6,661,486; 6,710,823; 6,656,543; and 6,800,337. Liquid crystalline materials have also been used in window glazing units, as described in U.S. Pat. Nos. 5,156,452; 5,285,299; 5,940,150; 6,072,549; 6,369,868; 6,473,143; and 6,633,354, for example.

It is desirable to have a composition that reduces the transmission of near infrared radiation and that can be used in a low-haze glazing unit that is also an effective safety glass unit.

SUMMARY OF THE INVENTION

The present invention provides a composition for reducing the transmission of near infrared radiation comprising:
  (a) a layer of a nonmicellar twisted nematic liquid crystal having cholesteric near infrared-reflecting properties; and
  (b) at least one near infrared absorptive material.

In one embodiment, the composition of the invention is incorporated within a near infrared reflecting layer.

In another embodiment, the near infrared absorptive material or the twisted nematic liquid crystal is in the form of at least one layer. Preferably, the composition of the invention further comprises a matrix material.

In still another embodiment, the near infrared reflecting layer is in the form of a coating on the surface of the layer of the nonmicellar twisted nematic liquid crystal.

In all the embodiments, the layer of the nonmicellar twisted nematic liquid crystal preferably has a reflective bandwidth greater than 100 nm, preferably greater than 120 nm and more preferably greater than 150 nm. Independently, but still preferably, the near infrared absorptive material preferably has an absorptive bandwidth greater than 100 nm preferably greater than 120 nm and more preferably greater than 150 nm.

The compositions of the present invention reduce the energy requirements of the structure or article in which they are used or to which they are applied by reducing the transmission of undesired near infrared radiation. These compositions are particularly suitable for use in safety glass for automobile and construction applications, as well as other applications.

DETAILED DESCRIPTION OF THE INVENTION

The following definitions apply to the terms as used throughout this specification, unless otherwise limited in specific instances.

The term "(meth)acrylic", as used herein, alone or in combined form, such as "(meth)acrylate", refers to acrylic and/or methacrylic, for example, acrylic acid and/or methacrylic acid, or alkyl acrylate and/or alkyl methacrylate.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

All percentages, parts, ratios, and the like set forth herein are by weight.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

The nonmicellar twisted nematic liquid crystal layer is also referred to herein as a nonmicellar twisted nematic liquid crystal film.

As used herein, solar control window film, solar control glass laminate and solar control glass refer to a window film, a glass laminate and glass that reduce the transmission of near infrared radiation and can be used in a structure such as an automobile or a building. As described above such glass typically consists of at least two glass sheets with one or more various other layers.

The ability of liquid crystalline materials in twisted nematic phases to selectively reflect light in the near infrared, visible or ultraviolet region is useful in many applications. When the propagation direction of plane polarized or unpolarized light is along the helical axis of the twisted nematic layer, the wavelength of maximum reflection, $\lambda_0$, is governed by the equation $\lambda_0 = n_a p$, wherein $n_a$ is the average of $n_o$ and $n_e$, and $n_o$ and $n_e$ are the ordinary and extraordinary refractive indices respectively of the twisted nematic phase measured in the propagation direction and p is the pitch of the helix (the distance the helix takes to repeat itself). Light outside the vicinity of $\lambda_0$ is essentially unaffected by the twisted nematic material. For light with a wavelength in the vicinity of wavelength $\lambda_0$, the twisted nematic phase exhibits selective reflection of the light such that approximately 50% of the light is reflected and approximately 50% of the light is transmitted assuming negligible absorption, with both the reflected and transmitted beams being substantially circularly polarized. A right-handed helix reflects right-handed circularly polarized light and transmits left-handed circularly polarized light. The bandwidth $\Delta\lambda$ of this reflected wavelength band centered about $\lambda_0$ can be determined by the formula $\Delta\lambda k = \lambda_0 \cdot \Delta n / n_a$, where $\Delta n = n_e - n_o$, a manifestation of the inherent birefringence present in liquid crystal materials. The pitch p can be tuned effectively by manipulating the amount of chiral dopant, the twisting power of the dopant and the selection of nematic materials. The pitch is sensitive to temperature, unwinding or tightening with a change in temperature; to electric fields, dopants, and other environmental considerations. Thus, in the twisted nematic phase, manipulation of the pitch, and thus the wavelength of maximum reflection, can be accomplished with a wide variety of tools. Furthermore, the bandwidth $\Delta\lambda$ of the reflected wavelength band also can be manipulated as disclosed in U.S. Pat. Nos. 5,506,704 and 5,793,456. For conventional materials, typical bandwidths in the visible region are less than 90 nm.

Depending upon the intrinsic rotatory sense of the helical nature of the twisted nematic substance, i.e. whether it is right-handed or left-handed, the light that is transmitted is either right-hand circularly polarized light (RHCPL) or left-hand circularly polarized light (LHCPL). The transmitted light is circularly polarized with the same sense of polarization as that intrinsic to the helical nature of the substance. Thus, a twisted nematic liquid crystal having an intrinsic helical structure which is left-handed will transmit LHCPL and one that is right-handed will transmit RHCPL.

Hereinafter, in order to conform to popular convention, the twisted nematic liquid crystal substances will be identified by the kind of light that is reflected in the wavelength region around $\lambda_0$. When a layer is said to be right-handed it is meant that it reflects RHCPL and when a layer is said to be left-handed it is meant that it reflects LHCPL. A right-handed twisted nematic liquid crystal substance transmits LHCPL essentially completely at $\lambda_0$ whereas the same substance reflects RHCPL almost completely. Conversely a left-handed film is almost transparent to RHCPL at $\lambda_0$ and reflects LHCPL almost completely. Since plane polarized or unpolarized light contains equal amounts of RHCPL and LHCPL, a twisted nematic liquid crystal film is approximately 50 percent transmitting at $\lambda_0$ for these sources.

Twisted nematic liquid crystal layers have a further unique optical property. The circular polarization of the light that is reflected by a mirror is reversed. This same phenomenon does not occur with light reflected by these liquid crystal layers. The sense of the circularly polarization of light reflected from these liquid crystal substances is not reversed, but rather remains the same as it was before it came into contact with the liquid crystal substance. For example, if RHCPL having a wavelength $\lambda_0$ is directed at a right-handed layer for which $\lambda_0 = n_a p$ it is substantially completely reflected and after reflection remains RHCPL. If the same light were to be directed on a mirror the reflected light would be LHCPL.

In a solar control application, it is preferred that substantially all the light at some wavelengths be reflected. This is not possible for a single layer of a given composition, as it is required for both handednesses at said wavelength be reflected.

One method for reflecting substantially all of the light in the vicinity of $\lambda_0$ is to use a birefringent material in a thickness sufficient to reverse the handedness of the light that is transmitted through one twisted nematic layer, a so-called half-wave plate or film. Half-wave plates are discussed in detail in a book by E. Hecht, entitled "Optics", published by Addison-Wesley Publishing Company, Inc., 1990, on pages 301-303. A preferred method of using a half-wave film is, for example, to use two twisted nematic liquid crystal layers of similar $\lambda_0$ and identical handedness on either side of the half-wave film. In the case that right handed layers with similar $\lambda_0$ are used on both sides of the half-wave film, the first twisted nematic layer reflects RHCPL, the half-wave layer converts the transmitted LHCPL to RHCPL, which is subsequently reflected by the second right handed twisted nematic layer. As the RHCPL reflected from the second twisted nematic layer once again traverses the half-wave layer subsequent to its reflection, it is converted to LHCPL, which is then transmitted by the initial RHCPL film without modification. In this way substantially all of the incident light with a wavelength in the vicinity of $\lambda_0$ will be reflected by the laminate comprised of the two twisted nematic liquid crystal layers and the half-wave layer, with theoretically none being transmitted. Compositions of this invention can be used in place of one or both of the two twisted nematic liquid crystal layers.

Another method for reflecting substantially all of the light in the vicinity of $\lambda_0$ is to use two twisted nematic liquid crystal layers with similar $\lambda_0$, one right handed and one left handed. The light in the region around $\lambda_0$ transmitted by the first layer will be reflected by the second layer so that substantially all of the incident light with a wavelength in the vicinity of $\lambda_0$ will be reflected by the laminate comprised of the two twisted nematic liquid crystal layers. Again, compositions of this invention can be used in place of one or both of the two twisted nematic liquid crystal layers.

There are various ways to make a twisted nematic liquid crystal layer with a reflective bandwidth of greater than 100 nm, 120 nm, or 150 nm. Such a layer can be a composite of several sublayers of twisted nematic liquid crystal, each sublayer having a different $\lambda_o$ but with the different $\lambda_o$'s sufficiently close to result in an extended reflective bandwidth of greater than 100 nm for the composite layer. Another way that a reflective bandwidth of greater than 100 nm can be achieved is by using a twisted nematic liquid crystal layer with a gradient in the pitch, e.g., having a continuously varying pitch.

For some applications it will be advantageous to reflect radiation in the wavelength range of about 650 nm to 750 nm in addition to reflecting radiation in the near infrared region of 750 nm to 2,100 nm. For other applications it will be advantageous to reflect radiation in other parts of the visible spectrum in addition to reflecting radiation in the near infrared. Multiple twisted nematic films are useful for enabling reflections at the shorter wavelengths as well as those that are of primary interest here.

Compounds used in the twisted nematic liquid crystal layer of the present invention comprise compounds which, alone or as a mixture, provide the layer with cholesteric near infrared-reflecting properties and high transmittance in the visible region of the electromagnetic spectrum. In principle, virtually all known twisted nematic monomers, monomer mixtures, polymers, polymer mixtures or monomer and polymer mixtures can be adjusted in the pitch of their helical superstructure by varying the content and composition of the chiral component in such a way that the reflection maximum lies within the near infrared (IR).

Alignment is used to create a uniform planar orientation and is critical for high visible transmittance and low levels of haze. In order to make a twisted nematic liquid crystal layer fully reflective of the center wavelength while simultaneously keeping scattered light to a minimum, it is necessary to align the liquid crystal film into a single domain. When preferential alignment is not achieved, a multidomain layer results. Such a multidomain texture is called the focal conic state. The focal conic state is predominately characterized by its highly diffused light scattering appearance caused by an abrupt change of the refractive indices at the boundary between cholesteric domains. This texture has no single optic axis, and therefore scatters in all directions. The focal conic texture is typically milky-white (i.e. white light scattering). If alignment is achieved, a single domain can be produced. These are called homeotropic and planar states of alignment. In the homeotropic state of a nematic liquid crystal, the molecular axis lies perpendicular to the plane of the nematic layer. In the planar state of a twisted nematic material, the axis of this helix is perpendicular to the plane of the twisted nematic layer. Light with a wavelength matching the pitch of the helix is reflected from the surface of the film and therefore the reflected light does not pass through the layer. It is this domain structure that is therefore most preferred.

There are several well known ways to achieve planar alignment of the twisted nematic phase. It is possible to induce planar orientation of a liquid crystal material by using a substrate with a surface that has been rubbed directly, i.e. without applying an alignment layer. It is also possible to put the liquid crystal material on a substrate, clear or otherwise, apply a clear substrate to the free surface of the liquid crystal, and slide one substrate relative to the other, providing a small amount of shear to the liquid crystal film. This often induces a planar state of alignment where the helicoidal axis of the structure is substantially perpendicular to the film.

Orientation layers for liquid crystal films can consist of a polymer film that has been mechanically rubbed so that the directors of the liquid crystal molecules align themselves with the rubbing direction. A commonly used polymer is polyimide, which is deposited as the poly(amic-acid). The poly(amic-acid) is then thermally cured, converting the material to the polyimide. The hardness of the polyamide is controlled by the amount of thermal curing. The resulting polyimide layer can be rubbed as above.

It is also possible that directional orientation in a subsequently deposited nematic liquid crystal can be produced using a vapor deposited silica layer on a substrate. The substrate can be a transparent glass on which a thin transparent layer of an electrical conductor such as indium-tin-oxide (ITO) has been previously deposited. The substrate is moved past a magnetron in-line sputtering source during deposition. One or more passes may be required during silica deposition, and the resulting structure has the necessary directionality as long as the substrate moves back and forth along the same direction past the sputtering source. After the deposition of the silica layer, the silica-treated substrate may be contacted with an alcohol at a sufficiently high temperature to react the alcohol with the hydroxyl groups on the surface of the silica layer. The alcohol treatment may be made with the substrate above 100° C., and most typically 120° to 160° C. After the alcohol treatment, the liquid crystal is contacted to the treated surface and the liquid crystal layer to adopt a planar orientation.

Additional methods of aligning twisted nematic liquid crystals are known to those skilled in the art. In addition, using known processes, it is possible to create alignment of twisted nematic liquid crystal layers on substrates ranging from minute individual pieces to continuous films.

There are many types of twisted nematic liquid crystalline materials. Twisted nematic polymerizable monomers, wherein the chiral monomer or monomers are themselves liquid crystalline, are one general category. Such materials are described in U.S. Pat. Nos. 5,942,030, 5,780,629, 5,886, 242 and 6,723,395. Another category is a mixture comprising at least one achiral, nematic, polymerizable monomer and a chiral compound. Examples of monomers and compounds of this type are described in U.S. Pat. No. 5,833,880, DE-A-4 408 170, and DE-A-4 405 316. Crosslinkable liquid crystalline polyorganosiloxanes, cyclic siloxanes, and tetraalkyldisiloxanes as are described in U.S. Pat. Nos. 4,388,453, 5,211, 877, 6,300,454, 6,486,338, and 6,358,574, when combined with a chiral dopant comprise another category of twisted nematic liquid crystals. Additional classes of twisted nematic liquid crystals include twisted nematic cellulose derivatives as described in DE-A-197 136 38, crosslinkable twisted nematic copolyisocyanates as described in U.S. Pat. No. 5,847, 068, and main chain polyesters as described in U.S. Pat. No. 6,107,447. These categories are exemplary and not limiting. It is contemplated that any twisted nematic liquid crystal composition that provides IR-reflecting properties and is mechanically and dimensionally stable under process and use conditions can be useful herein, whether currently known or later developed.

Preferred compositions for forming the polymer networks useful as the twisted nematic IR-reflecting liquid crystal layer are the bis(meth)acrylate liquid crystal compounds and combinations thereof.

A bis(meth)acrylate compound of one preferred type has the formula (I):

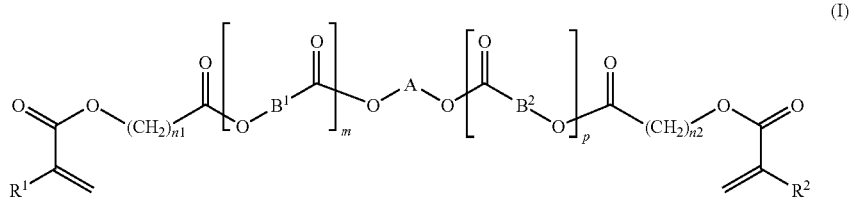

wherein $R^1$ and $R^2$ are each independently selected from the group: H, F, Cl and $CH_3$; n1 and n2 are each independently integers from 3 to 20, inclusive; m and p are each independently integers 0, 1 or 2; A is a divalent radical selected from the group:

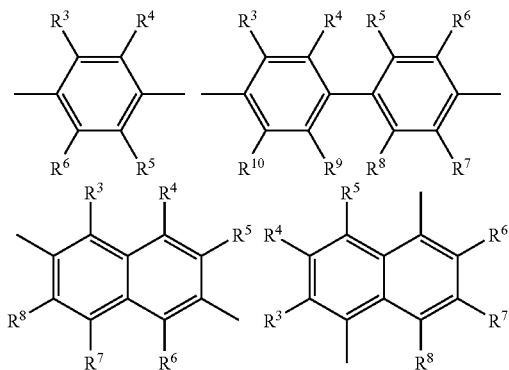

wherein $R^3$—$R^{10}$ are each independently selected from the group: H, C1-C8 straight or branched chain alkyl, C1-C8 straight or branched chain alkyloxy, F, Cl, phenyl, —C(O)$CH_3$, CN, and $CF_3$; $X^2$ is a divalent radical selected from the group: —O—, —$(CH_3)_2C$—, and —$(CF_3)_2C$—; and each $B^1$ and $B^2$ is a divalent radical independently selected from the group: $R^{11}$-substituted-1,4-phenyl, wherein $R^{11}$ is H, —$CH_3$ or —$OCH_3$; 2,6-naphthyl; and 4,4'-biphenyl; with the proviso that when m+p is equal to 3 or 4, at least two of $B^1$ and $B^2$ are $R^{11}$-substituted-1,4-phenyl.

A bis(meth)acrylate compound of another preferred type has the formula (II):

wherein $R^1$ and $R^2$ are each independently selected from the group: H, F, Cl and $CH_3$; n1 and n2 are each independently integers from 3 to 20 inclusive; q and r are each independently integers 0, 1 or 2, with the proviso that q+r≧1; D is a divalent chiral radical selected from the group:

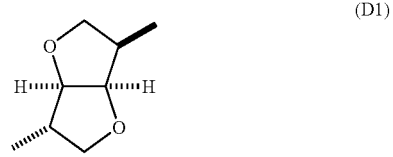

(D1)

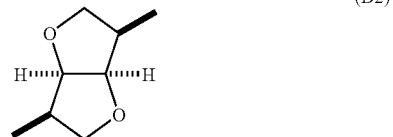

(D2)

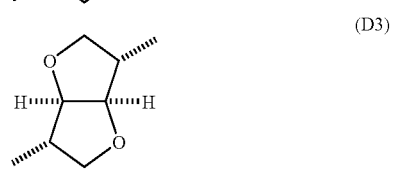

(D3)

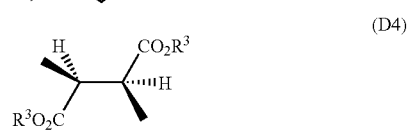

(D4)

wherein $R^3$ is a C1 to C6 straight or branched chain alkyl group; and each $B^1$ and $B^2$ is a divalent radical independently selected from the group: $R^4$-substituted-1,4-phenyl, wherein $R^4$ is H, —$CH_3$ or —$OCH_3$; 2,6-naphthyl; and 4,4'-biphenyl; wherein when q+r=3, at least one of $B^1$ and $B^2$ is $R^4$-substituted-1,4-phenyl; and when q+r=4, at least two of $B^1$ and $B^2$ are $R^{11}$-substituted-1,4-phenyl. In the phrase "each $B^1$ and $B^2$ is a divalent radical independently selected from the group",

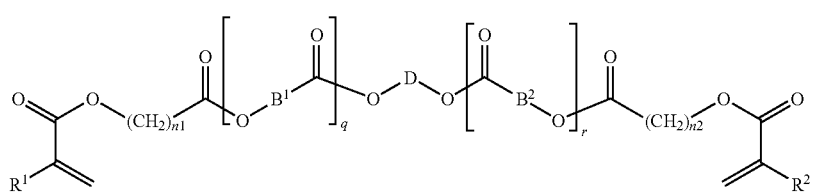

(II)

when q=2, the two $B^1$ units are selected independently, that is they may be the same or different; and when r=2, the two $B^2$ units are selected independently, that is they may be the same or different.

The most preferred bis(meth)acrylate compounds for forming a twisted nematic IR-reflecting liquid crystal layer are those with the formulas A through E and combinations thereof:

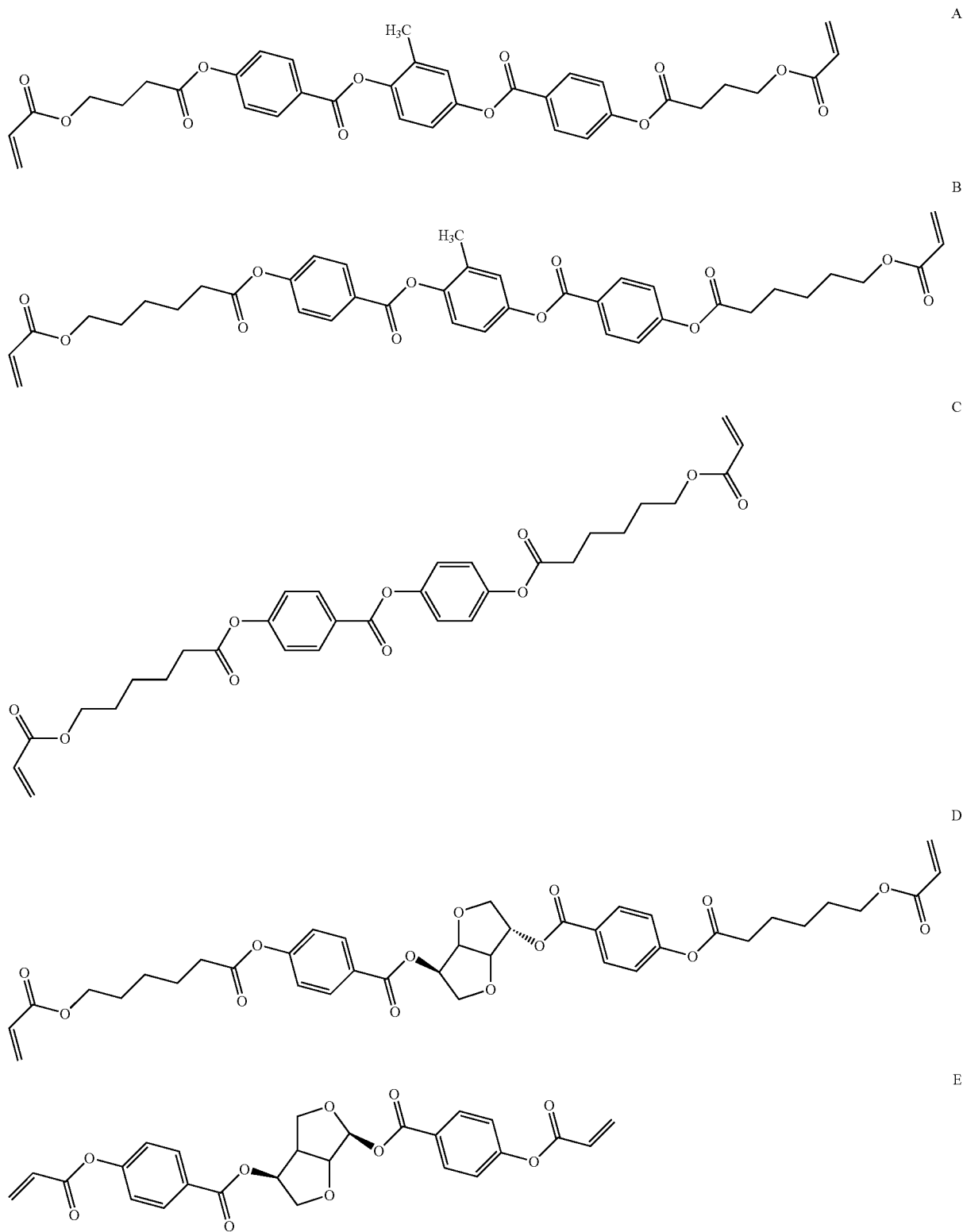

A process for making the compounds of formula (I) comprises: (a) providing one or more organic polyol(s) wherein each polyol comprises at least two hydroxyl groups and at least two covalently bonded carbon atoms, each hydroxyl group being bonded to a different carbon atom within an organic polyol; (b) reacting the organic polyol(s) with a sufficient amount of one or more functionalized alkyl acid halide(s) of the Formula (III):

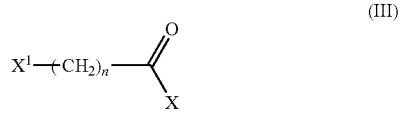

(III)

wherein X is Cl or Br; $X^1$ is selected from the group: Cl, Br, I, —OMs (wherein Ms is methanesulfonyl), —OTs (wherein Ts is toluenesulfonyl), and —OTf (wherein Tf is trifluoromethanesulfonyl); and n is an integer equal to 3 to 20; and a first reaction solvent at a first reaction temperature to provide one or more polyfunctionalized aryl alkanoate ester(s) and a first spent reaction mixture; and (c) reacting the one or more polyfunctionalized aryl alkanoate ester(s) with a sufficient amount of (meth)acrylate salt in the presence of a sufficient amount of phase transfer catalyst, and a second reaction solvent at a second reaction temperature; to provide one or more poly(meth)acrylate-aryl alkanoate ester(s) and a second spent reaction mixture.

A process for making the compounds of formula (II) comprises: (a) providing a chiral organic diol; (b) reacting the chiral organic diol with a sufficient amount of one or more functionalized alkyl acids or acid halide(s) of the formula (IV):

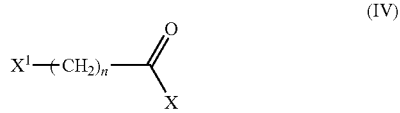

(IV)

wherein X is Cl, Br or OH; $X^1$ is selected from the group: Cl, Br, I, —OMs, —OTs, and —OTf (wherein Ms, Ts and Tf are as defined above); and n is an integer equal to 3 to 20; in a first reaction solvent at a first reaction temperature to provide one or more polyfunctionalized alkyl ester(s) and a first spent reaction mixture; (c) reacting the one or more polyfunctionalized alkyl ester(s) with a sufficient amount of (meth)acrylate salt in the presence of a sufficient amount of phase transfer catalyst, and a second reaction solvent at a second reaction temperature; to provide one or more poly(meth)acrylate-alkyl ester(s) and a second spent reaction mixture. Preferably, the process step (b) further comprises the uses of a base, and when X is OH, further comprises the use of a carbodiimide dehydrating agent. Step (c) preferably further comprises the use of one or more radical inhibitors.

For the purposes of the present invention, by crosslinkable or crosslinking it is meant the ability to covalently link or the covalent linking of polymeric compounds.

For the purposes of the present invention, polymerizable or polymerization means the ability to covalently link or the covalent linking of monomeric compounds to form polymers.

By curing is meant crosslinking, polymerization or the locking-in of the cholesteric phase. In the present invention, curing fixes the uniform orientation of the cholesteric molecules in the cholesteric layer.

Twisted nematic liquid crystal layers and/or compositions can be coated, adhered, or applied in any conventional manner, or in a non-conventional manner, that conforms to the purposes and design of the invention described herein. Suitable conventional methods for applying twisted nematic liquid crystal compositions to a substrate include, without limitation, lamination and the use of chemical adhesive agents. In addition, the twisted nematic IR-reflecting liquid crystal layer can be applied directly to a polymer sheet substrate, a polymeric film substrate or a glass substrate by customary or novel techniques. Examples of customary techniques include, but are not limited to, by means of techniques selected from extrusion or co-extrusion; air knife coating; bar coating; squeeze coating; impregnating; reverse roll coating; transfer roll coating; gravure coating; kiss coating; casting, spraying; spin coating; or printing techniques such as letterpress, flexographic, intaglio, transfer printing, offset or screen printing.

The IR-reflecting layer can be applied in the form of a low-viscosity or high-viscosity mixture to a substrate, but preferably as a low-viscosity mixture. To this end the cholesteric mixtures can be applied to the substrate in undiluted or minimally diluted form at an elevated temperature or in a more diluted form at a low temperature.

The twisted nematic liquid crystal mixtures can be diluted with any suitable polymerizable diluent prior to their application to the substrate. Examples of suitable polymerizable diluents include, for example, 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate, tetraethylene glycol dimethacrylate, pentaerythritol tetraacrylate and ethoxylated pentaerythritol tetraacrylate. The amount of diluent should be kept sufficiently low to not disturb the twisted nematic phase.

In order to adjust the viscosity and the leveling behavior, it is possible for the cholesteric liquid crystal mixtures to be mixed with additional components. For example, it is possible to employ polymeric binders and/or monomeric compounds which can be converted into a polymeric binder by polymerization. Examples of suitable compounds are organic-solvent soluble polyesters, cellulose esters, polyurethanes and silicones, including polyether- or polyester-modified silicones. It is particularly preferred to employ cellulose esters such as cellulose acetobutyrate. However, if polymeric binders and/or monomeric compounds are included in the compositions useful in the present invention, it is desired to maintain the nonmicellar structure of the twisted nematic liquid crystal layer to preserve laminate clarity and low haze. The addition of small amounts of suitable leveling agents may also be advantageous. It is possible to employ them from about 0.005 to 1% by weight, in particular from 0.01 to 0.5% by weight, based on the amount of cholesteric liquid crystal in the mixture. Examples of suitable leveling agents are glycols, silicone oils and, in particular, acrylate polymers, such as the acrylate copolymers obtainable under the name Byk 361 or Byk 358 from Byk-Chemie USA of Wallingford, Conn., and the modified, silicone-free acrylate polymers obtainable under the name Tego Flow ZFS 460 from the Tego brand of Degussa AG through Degussa Goldschmidt of Hopewell, Va.

The cholesteric mixture may also include stabilizers to counter the effects of UV and weather. Examples of suitable additives are derivatives of 2,4-dihydroxybenzophenone, derivatives of 2-cyano-3,3-diphenyl acrylate, derivatives of 2,2',4,4'-tetrahydroxybenzophenone, derivatives of ortho-hydroxyphenylbenzotriazole, salicylic esters, ortho-hydroxyphenyl-s-triazines or sterically hindered amines. These substances can be employed alone or, preferably, as mixtures.

The IR-reflecting layer(s) applied can be cured thermally, photochemically or by a beam of electrons. Curing will preferably take place while the material is in the cholesteric phase and with retention of the cholesteric phase. For photochemical polymerization, the cholesteric mixture may include customary commercial photoinitiators. For curing by electron beam, such initiators are not required.

Where two or more layers are applied, they can in each case be applied, dried, if desired, and cured individually. However, it is likewise possible to apply two or more, or all, of the layers to be applied in one application procedure, wet-on-wet, to the article that is to be coated, to carry out conjoint drying if desired and then to carry out conjoint curing. Casting techniques are particularly suitable for the simultaneous application of cholesteric layers, especially knife or bar casting techniques, cast-film extrusion or stripper casting techniques, and the cascade casting process.

The absorptive material used in the present invention may incorporate inorganic near infrared absorbers, organic near infrared absorbers, or combinations thereof. Near infrared absorptive materials, as used herein, means absorptive materials having a local maximum in the absorption spectra between 750 nm and 2100 nm. The absorptive material of the present invention may include as many absorptive components as needed to provide the spectral absorptive characteristics desired.

Nanoparticles of inorganic near infrared absorptive material are particularly useful in forming the absorptive layer. These inorganic near infrared absorptive particles have a nominal particle size of less than about 200 nanometers (nm), preferably less than about 100 nm, more preferably less than about 50 nm, more preferably less than about 30 nm, and most preferably within the range of about 1 nm to about 20 nm. The small particle size is required due to the high refractive indices of the near infrared absorptive nanoparticles and their relationship to clarity and haze within the uses thereof contemplated herein. The inorganic near infrared absorptive particles may be surface treated with, for example, a silane compound, a titanium compound or a zirconia compound, to improve properties such as water resistance, thermal oxidative stability, and dispersability.

Examples of inorganic near infrared absorptive nanoparticles useful in the present invention include, but are not limited to, metals, compounds containing metals, composites containing metals, and mixtures thereof. The metals are preferably selected from the group consisting of tin, zinc, zirconium, iron, chromium, cobalt, cerium, indium, nickel, silver, copper, platinum, manganese, tantalum, tungsten, vanadium, antimony, lanthanum and molybdenum. Compounds containing metals are preferably selected from the group consisting of oxides, nitrides, oxynitrides, and sulfides of the metals. Composites containing metals are preferably selected from the group consisting of the metals doped with at least one substance and the compounds doped with at least one substance. By "at least one substance" it is meant a one or more substances selected from the group consisting of antimony, antimony compounds, fluorine, fluorine compounds, tin, stannous compounds, titanium, titanium compounds, silicon, silicon compounds, aluminum and aluminum compounds.

Additional examples of inorganic near infrared absorptive nanoparticles useful in the present invention include metal boride nanoparticles, preferably metal boride nanoparticles comprising at least one member selected from the group consisting of lanthanum hexaboride ($LaB_6$), praseodymium hexaboride ($PrB_6$), neodymium hexaboride ($NdB_6$), cerium hexaboride ($CeB_6$), gadolinium hexaboride ($GdB_6$), terbium hexaboride ($TbB_6$), dysprosium hexaboride ($DyB_6$), holmium hexaboride ($HoB_6$), yttrium hexaboride ($YB_6$), samarium hexaboride ($SmB_6$), europium hexaboride ($EuB_6$), erbium hexaboride ($ErB_6$), thulium hexaboride ($TmB_6$), ytterbium hexaboride ($YbB_6$), lutetium hexaboride ($LuB_6$), strontium hexaboride ($SrB_6$), calcium hexaboride ($CaB_6$), titanium boride ($TiB_2$), zirconium boride ($ZrB_2$), hafnium boride ($HfB_2$), vanadium boride ($VB_2$), tantalum boride ($TaB_2$), chromium borides (CrB and $CrB_2$), molybdenum borides ($MoB_2$, $Mo_2B_5$ and MoB) and tungsten boride ($W_2B_5$), and mixtures thereof. These inorganic near infrared absorptive nanoparticles block near infrared energy substantially through absorption of the near infrared energy.

More preferably, the inorganic near infrared absorptive nanoparticles are selected from the group consisting of: antimony-doped tin oxide also referred to herein as antimony tin oxide; tin-doped indium oxide also referred to herein as indium tin oxide; lanthanum hexaboride ($LaB_6$); and mixtures thereof. For the tin oxide nanoparticles containing antimony, the antimony level is preferably in the range of about 0.1 weight percent to about 20 weight percent, more preferably in the range of about 5 weight percent to about 15 weight percent, and most preferably in the range of about 8 weight percent to about 10 weight percent, based on the total weight of the antimony tin oxide. For the indium oxide nanoparticles containing tin, the tin level is preferably in the range of from about 1 to about 15 atomic percent based on the sum of (Sn+In) atoms, more preferably from about 2 to about 12 atomic percent, i.e., the tin content in a molar ratio Sn/(Sn+In) is preferably from about 0.01 to about 0.15, more preferably from about 0.02 to about 0.12.

Absorptive materials useful in the present invention may also comprise organic near infrared absorbents including, but not limited to, polymethine dyes, amminium dyes, imminium dyes, dithiolene-type dyes and rylene-type, naphthalocyanine-type or phthalocyanine-type dyes and pigments, and combinations thereof.

In the case that the absorptive material is not located in the same layer as the twisted nematic reflective material, it is preferred that the twisted nematic reflector be located in a layer that is outboard to the absorptive layer, that is more toward the exterior of the building or vehicle, so that in the case where the reflected and absorbed bands of radiation overlap the overlapped band will be reflected rather than being absorbed. This leads to a decrease in the amount of energy that passes through the glazing because the glazing will not warm up as much as in the case where the absorber is on the outboard side of the glazing.

The embodiment of the invention in which the near infrared absorptive material is incorporated within the layer of the nonmicellar twisted nematic liquid crystal can be prepared by adding inorganic near infrared absorptive material, e.g., near infrared absorptive nanoparticles, to a twisted nematic liquid crystal precursor solution. The solution is then coated onto a substrate suitable for the particular application. For use in safety glass, a typical substrate is a glass plate, a biaxially oriented poly(ethylene terephthalate) film or a polymeric sheet. The coating is then processed to produce a right-handed or left-handed nonmicellar twisted nematic liquid crystal layer in which the near infrared absorptive nanoparticles have been incorporated. Layers of opposite handedness can be deposited successively with one or both layers incorporating near infrared absorptive material. Layers of the same handedness can be coated onto opposite sides of a half-wave plate, again with one or both layers incorporating near infrared absorptive material.

The embodiment of the invention in which the absorptive material is in the form of at least one layer can be can be prepared in various ways. The absorptive material can be incorporated into or coated onto a substrate to provide a layer of absorptive material. When coated onto a substrate, the inorganic near infrared absorptive particles can be incorporated within a matrix material, which may be organic or inorganic. The matrix material may comprise a high polymer, a reactive oligomer, a reactive prepolymer, a reactive monomer or mixtures thereof. Preferably, the matrix material is transparent.

Matrix materials in the form of polymeric films coated with indium tin oxide are commercially available from Tomoegawa Paper Company, Ltd. (Tokyo, Japan). Matrix materials in the form of polymeric films coated with antimony tin oxide (ATO) are commercially available. Sumitomo Osaka Cement Company. Matrix materials in the form of polymeric films which incorporate lanthanum hexaboride ($LaB_6$) nanoparticles are commercially available from Sumitomo Metal Mining Company (Tokyo, Japan).

In the embodiment in which the absorptive material is in the form a coating on the surface of the layer of the nonmicellar twisted nematic liquid crystal, the coating can be applied by a variety of methods. For example, inorganic near infrared absorptive particles can be incorporated within a matrix resin as described above.

The compositions of the invention can be used in conjunction with polymeric sheets, polymeric films, rigid sheets, half wave plates and the like to form multilayer laminates that minimize the transmission of near infrared radiation and provide low-haze, glazing units that are also effective safety glass units. These multilayer laminates are useful as windows, for example, in automobiles and buildings.

The following examples are provided to describe the invention in further detail. These examples, which set forth a preferred mode presently contemplated for carrying out the invention, are intended to illustrate and not to limit the invention.

EXAMPLES OF THE INVENTION

Standard Process for Alignment Layer Application

Glass plates were cleaned by placing them in a beaker with a solution of water and Micro-90 cleaning solution in a sonic bath. After sonication they were rinsed with deionized water and dried with a towel.

4 gm of Pyralin® PI12555 was mixed with 12 gm of solvent thinner T9039 (both from HD Microsystems). A Headway Research PWM32 Spin Coater was used to coat the glass substrates with the polyimide solution. The glass plates rinsed with isopropyl alcohol and spun until dryness prior to applying the polyimide solution. Polyimide solution was applied and spun according to the following program: 500 RPM for 5 sec, then 2000 RPM for 5 sec, then 5000 RPM for 30 sec. The plates were then put on hot plate at 120° C. for 1 min., followed by a second hot plate at 150° C. for 1 min. to soft bake the polyimide. The polyimide was finally cured by placing the coated substrates in aluminum pans and then treated in air in a box furnace. The furnace was programmed to ramp from room temperature to 200° C. at 5° C./min., then hold at 200° C. for 30 min., then cool. Following this treatment, the box furnace was purged with nitrogen at a flow rate of 10 slpm, and the furnace was heated using the following program: room temperature (RT) to 200° C. at 4° C./min., hold at 200° C. for 30 min., then ramp from 200° C. to 300° C. at 2.5° C./min., then hold at 300° C. for 60 min. The glass plates were allowed cool in the oven for 2 hours 10 minutes to 88° C. and removed from the oven.

Standard Process for Substrate-Rubbing

A rubbing process was used both directly on the poly (ethylene terephthalate) films and on the glass plates after the application of the alignment layer and before the application of the coating solution in order to ensure the formation of a planar texture. Each substrate was rubbed 20 times in the same direction using Rubbing Cloth YA-25-C available from the Yoshikawa Kako K.K. mounted on a 2.75" by 5.5" inch block under moderate hand pressure.

Standard Process for Creating Alignment Layers on Glass

In the examples below, when a twisted nematic solution is applied to glass, the glass substrate has been previously coated with an alignment layer and rubbed. The twisted nematic solution is subsequently applied to the alignment layer. This procedure is used regardless of the type of glass being coated.

Standard Process for Creating Alignment Layers on Poly (ethylene terephthalate) Films In the examples below, when a twisted nematic solution is applied to poly(ethylene terephthalate) film, the film to which the solution is applied has been previously rubbed, and said solution is applied to the rubbed side of the film. When the substrate is a poly(allyl amine) primed poly(ethylene terephthalate) film, the film has been primed on only one side. The side of the film that has not been primed is rubbed, and the twisted nematic solution is applied to the rubbed side.

Standard Process for Creating Alignment Layers on Raybarrier®, Soft Look® and "KH" Films In the examples below, when a twisted nematic solution is applied to Raybarrier®, Soft Look® or "KH" Films, the poly(ethylene terephthalate) side of the multilayer film is rubbed, and the twisted nematic solution is applied to the rubbed side. The side opposite the rubbed and liquid crystal coated side is coated with the transparent binder containing the near infrared absorbing nanoparticles.

Standard Process for Coating Substrates with Twisted Nematic Layers

In addition to species specifically mentioned in the examples, twisted nematic film precursor solutions are comprised of a solvent and liquid crystalline materials such that when the solvent is removed the result is a twisted nematic liquid crystal film. The resulting film can be a solid, or can be a liquid that can subsequently be converted to a solid by crosslinking.

Example 1

Antimony tin oxide nanoparticles (with an average particle size of 10 nm) are added to a twisted nematic film precursor solution. The twisted nematic film precursor solution is formulated and processed such that the resulting solid twisted nematic film reflects right handed circularly polarized light is coated onto a clear annealed float glass plate substrate (6 inches by 12 inches by 2.5 mm thick).

Example 2

Indium tin oxide nanoparticles (with an average particle size of 20 nm) are added to a twisted nematic film precursor solution. The twisted nematic film precursor solution is formulated and processed such that the resulting solid twisted nematic film reflects left handed circularly polarized light is coated onto a clear annealed float glass plate substrate (6 inches by 12 inches by 2.5 mm thick).

Example 3

Lanthanum hexaboride nanoparticles (with an average particle size of 20 nm) are added to a twisted nematic film precursor solution. The twisted nematic film precursor solution is formulated and processed such that the resulting solid twisted nematic film reflects right handed circularly polarized light is coated onto a clear annealed float glass plate substrate (6 inches by 12 inches by 2.5 mm thick). Subsequently, on top of the free surface of the above described right handed twisted nematic layer is coated a twisted nematic film precursor solution, formulated and processed such that the resulting solid twisted nematic film reflects left handed circularly polarized light.

Example 4

Antimony tin oxide nanoparticles (with an average particle size of 10 nm) are added to a twisted nematic film precursor solution. The twisted nematic film precursor solution is formulated and processed such that the resulting solid twisted nematic film reflects right handed circularly polarized light is coated onto a biaxially oriented poly(ethylene terephthalate) film substrate (6 inches by 12 inches by 4 mils thick (0.004 inch)).

Example 5

Indium tin oxide nanoparticles (with an average particle size of 20 nm) are added to a twisted nematic film precursor solution. The twisted nematic film precursor solution is formulated and processed such that the resulting solid twisted nematic film reflects left handed circularly polarized light is coated onto a flame treated biaxially oriented poly(ethylene terephthalate) film substrate (6 inches by 12 inches by 4 mils thick (0.004 inch)).

Example 6

Lanthanum hexaboride nanoparticles (with an average particle size of 20 nm) are added to a twisted nematic film precursor solution. The twisted nematic film precursor solution is formulated and processed such that the resulting solid twisted nematic film reflects right handed circularly polarized light is coated onto a poly(allyl amine)-primed biaxially oriented poly(ethylene terephthalate) film substrate (6 inches by 12 inches by 4 mils thick (0.004 inch)). Subsequently, on top of the free surface of the above described right handed twisted nematic layer is coated a twisted nematic film precursor solution, formulated and processed such that the resulting solid twisted nematic film reflects left handed circularly polarized light.

Example 7

A twisted nematic film precursor solution, formulated and processed such that the resulting solid twisted nematic film reflects right handed circularly polarized light is coated onto an near infrared absorptive glass plate substrate (6 inches by 12 inches by 2.5 mm thick).

Example 8

A twisted nematic film precursor solution, formulated and processed such that the resulting solid twisted nematic film reflects left handed circularly polarized light is coated onto a Solex® green glass plate substrate (6 inches by 12 inches by 2.5 mm thick).

Example 9

A twisted nematic film precursor solution, formulated and processed such that the resulting solid twisted nematic film reflects right handed circularly polarized light is coated onto a biaxially oriented poly(ethylene terephthalate) film substrate (6 inches by 12 inches by 4 mils thick (0.004 inch)) which incorporates a phthalocyanine-type near infrared absorbent material. Subsequently, on top of the free surface of the above described right handed twisted nematic layer is coated a twisted nematic film precursor solution, formulated and processed such that the resulting solid twisted nematic film reflects left handed circularly polarized light.

Example 10

A twisted nematic film precursor solution, formulated and processed such that the resulting solid twisted nematic film reflects right handed circularly polarized light is coated onto an near infrared absorbent flame treated biaxially oriented poly(ethylene terephthalate) film substrate (6 inches by 12 inches by 4 mils thick (0.004 inch)).

Example 11

A twisted nematic film precursor solution, formulated and processed such that the resulting solid twisted nematic film reflects left handed circularly polarized light is coated onto a poly(allyl amine)-primed biaxially oriented poly(ethylene terephthalate) film substrate (6 inches by 12 inches by 4 mils thick (0.004 inch)) which incorporates a mixture of three different phthalocyanine-type near infrared absorbent materials to provide an absorptive bandwidth of greater than 100 nm.

Example 12

A twisted nematic film precursor solution, formulated and processed such that the resulting solid twisted nematic film reflects right handed circularly polarized light is coated onto a Raybarrier® TFI-5063N film (6 inches by 12 inches, a product of the Sumitomo Osaka Cement Company, Ltd., Chiba, Japan), coated with antimony tin oxide contained within a binder. Subsequently, on top of the free surface of the above described right handed twisted nematic layer is coated a twisted nematic film precursor solution, formulated and processed such that the resulting solid twisted nematic film reflects left handed circularly polarized light.

Example 13

A twisted nematic film precursor solution, formulated and processed such that the resulting solid twisted nematic film reflects right handed circularly polarized light is coated onto a Soft Look® UV/IR 25 film (6 inches by 12 inches, a product of the Tomoegawa Company), coated with indium tin oxide contained within a binder.

Example 14

A twisted nematic film precursor solution, formulated and processed such that the resulting solid twisted nematic film reflects left handed circularly polarized light is coated onto a "KH" film (6 inches by 12 inches, a product of the Sumitomo Metal Mining Company), coated with lanthanum hexaboride contained within a binder.

Example 15

Example 15 comprises a cured twisted nematic Solar Control Film on glass from Chelix Technologies Corp., 520 Mercury Drive, Sunnyvale, Calif. 94085, USA, which has a reflection bandwidth greater than 100 nm which is dipped into a solution of phthalocyanine-type near infrared dye and subsequently is dried.

Example 16

Example 16 comprises a cured twisted nematic Solar Control Film on glass from Chelix Technologies Corp., 520 Mercury Drive, Sunnyvale, Calif. 94085, USA, which has a reflection bandwidth greater than 100 nm is adhered to an near infrared absorptive glass plate substrate (6 inches by 12 inches by 2.5 mm thick) using pressure sensitive laminating adhesive 8141 from the 3M Corporation.

Example 17

Example 17 comprises a cured twisted nematic Solar Control Film on glass from Chelix Technologies Corp., 520 Mercury Drive, Sunnyvale, Calif. 94085, USA, which has a reflection bandwidth greater than 100 nm is adhered to a Solex® green glass plate substrate (6 inches by 12 inches by 2.5 mm thick) using Hysol E-30CL epoxy resin formulation from the Henkel Loctite Corporation.

Example 18

Example 18 comprises a cured twisted nematic Solar Control Film on glass from Chelix Technologies Corp., 520 Mercury Drive, Sunnyvale, Calif. 94085, USA, which has a reflection bandwidth greater than 100 nm is adhered to a biaxially oriented poly(ethylene terephthalate) film substrate (6 inches by 12 inches by 4 mils thick (0.004 inch)) which incorporates a phthalocyanine-type near infrared absorbent material, using RTV-108 siloxane resin from the GE Company.

Example 19

Example 19 comprises a cured twisted nematic Solar Control Film on glass from Chelix Technologies Corp., 520 Mercury Drive, Sunnyvale, Calif. 94085, USA, which has a reflection bandwidth greater than 100 nm is adhered to an near infrared absorbent flame treated biaxially oriented poly(ethylene terephthalate) film substrate (6 inches by 12 inches by 4 mils thick (0.004 inch)) using pressure sensitive laminating adhesive 8141 from the 3M Corporation.

Example 20

Example 20 comprises a cured twisted nematic Solar Control Film on glass from Chelix Technologies Corp., 520 Mercury Drive, Sunnyvale, Calif. 94085, USA, which has a reflection bandwidth greater than 100 nm is adhered to a poly(allyl amine)-primed biaxially oriented poly(ethylene terephthalate) film substrate (6 inches by 12 inches by 4 mils thick (0.004 inch)) which incorporates a mixture of three different phthalocyanine-type near infrared absorbent materials to provide an absorptive bandwidth of greater than 100 nm using Hysol E-30CL epoxy resin formulation from the Henkel Loctite Corporation.

Example 21

Example 21 comprises a cured twisted nematic Solar Control Film on glass from Chelix Technologies Corp., 520 Mercury Drive, Sunnyvale, Calif. 94085, USA, which has a reflection bandwidth greater than 100 nm is adhered to a Raybarrier® TFI-5063N film (6 inches by 12 inches, a product of the Sumitomo Osaka Cement Company, Ltd., Chiba, Japan), coated with antimony tin oxide contained within a binder, using RTV-108 siloxane resin from the GE Company.

Example 22

Example 22 comprises a cured twisted nematic Solar Control Film on glass from Chelix Technologies Corp., 520 Mercury Drive, Sunnyvale, Calif. 94085, USA, which has a reflection bandwidth greater than 100 nm is adhered to a Soft Look® UV/IR 25 film (6 inches by 12 inches, a product of the Tomoegawa Company), coated with indium tin oxide contained within a binder using a pressure sensitive laminating adhesive 8141 from the 3M Corporation.

Example 23

Example 23 comprises of a cured twisted nematic Solar Control Film on glass from Chelix Technologies Corp., 520 Mercury Drive, Sunnyvale, Calif. 94085, USA, which has a reflection bandwidth greater than 100 nm is adhered to a "KH" film (6 inches by 12 inches, a product of the Sumitomo Metal Mining Company), coated with lanthanum hexaboride contained within a binder Hysol E-30CL epoxy resin formulation from the Henkel Loctite Corporation.

Example 24

A twisted nematic film precursor solution, formulated such that the cured multilayer film has a reflection bandwidth greater than 100 nm is made using the following process. Four coating solutions are made by combining compounds 1 and 2 in the ratios indicated in Table 1. Cellulose acetobutyrate in a concentration of 0.8% by weight based on the cholesteric mixture is added to each solution employed in order to improve layering, and the solutions are dissolved in butyl acetate. 2,4,6-trimethylbenzoyl diphenylphosphine oxide as photoinitiator is added to each solution in a concentration of 1.5% by weight, based on the cholesteric mixture. Solution number 1 additionally incorporates antimony tin oxide nanoparticles (with an average particle size of 10 nm). Each solution is applied with a doctor blade in a wet-film thickness of 30 micrometers and crosslinked photochemically using an UV light source prior to the application of a subsequent layer. In this example, the multilayer stack is coated onto a clear annealed float glass plate substrate (6 inches by 12 inches by 2.5 mm thick

TABLE 1

| Solution number | Compound 1 | Compound 2 |
|---|---|---|
| 1 | .973 | .027 |
| 2 | .976 | .024 |

TABLE 1-continued

| Solution number | Compound 1 | Compound 2 |
| --- | --- | --- |
| 3 | .979 | .021 |
| 4 | .982 | .018 |

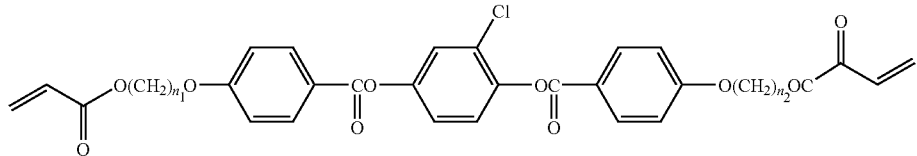

(1)

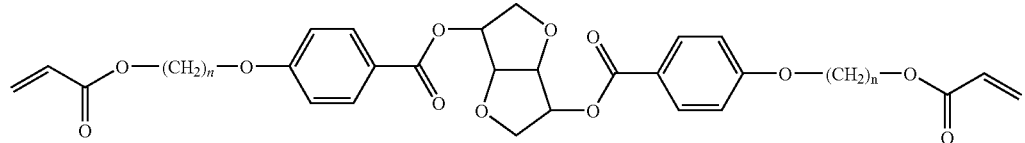

(2)

Example 25

Example 24 is repeated except the antimony tin oxide nanoparticles are replaced with indium tin oxide nanoparticles (with an average particle size of 20 nm).

Example 26

Example 24 is repeated except the antimony tin oxide nanoparticles are replaced with lanthanum hexaboride nanoparticles (with an average particle size of 20 nm).

Example 27

Example 24 is repeated except the clear annealed float glass plate substrate is replaced with a biaxially oriented poly(ethylene terephthalate) film substrate (6 inches by 12 inches by 4 mils thick (0.004 inch)).

Example 28

Example 25 is repeated except the clear annealed float glass plate substrate is replaced with a flame treated biaxially oriented poly(ethylene terephthalate) film substrate (6 inches by 12 inches by 4 mils thick (0.004 inch)).

Example 29

Example 26 is repeated except the clear annealed float glass plate substrate is replaced with a poly(allyl amine)-primed biaxially oriented poly(ethylene terephthalate) film substrate (6 inches by 12 inches by 4 mils thick (0.004 inch))

Example 30

A twisted nematic film precursor solution, formulated such that the cured multilayer film has a reflection bandwidth greater than 100 nm is made using the following process. Four coating solutions are made by combining compounds 1 and 2 in the ratios indicated in Table 2. Cellulose acetobutyrate in a concentration of 0.8% by weight based on the cholesteric mixture is added to each solution employed in order to improve layering, and the solutions are dissolved in butyl acetate. 2,4,6-Trimethylbenzoyldiphenylphosphine oxide as photoinitiator is added to each solution in a concentration of 1.5% by weight, based on the cholesteric mixture. Solution number 4 additionally incorporates antimony tin oxide nanoparticles (with an average particle size of 10 nm). Each solution is applied with a doctor blade in a wet-film thickness of 30 micrometers and crosslinked photochemically using an UV light source prior to the application of a subsequent layer. In this example, the multilayer stack is coated onto a clear annealed float glass plate substrate (6 inches by 12 inches by 2.5 mm thick).

TABLE 2

| Solution number | Compound 1 | Compound 2 |
| --- | --- | --- |
| 1 | .973 | .027 |
| 2 | .976 | .024 |

TABLE 2-continued

| Solution number | Compound 1 | Compound 2 |
|---|---|---|
| 3 | .979 | .021 |
| 4 | .982 | .018 |

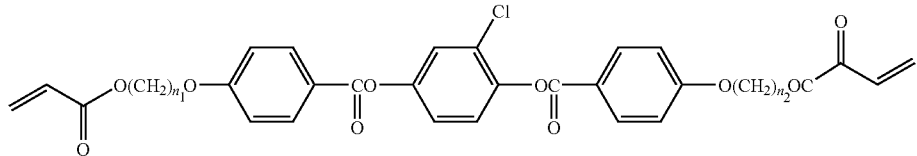

(1)

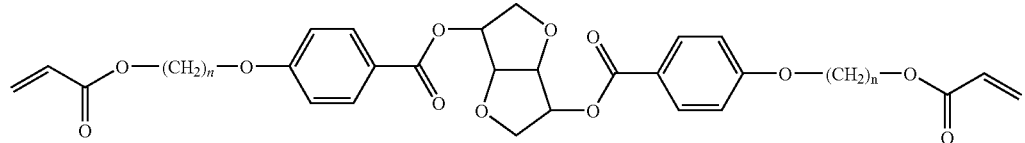

(2)

Example 31

Example 30 is repeated except the antimony tin oxide nanoparticles are replaced with indium tin oxide nanoparticles (with an average particle size of 20 nm).

Example 32

Example 30 is repeated except the antimony tin oxide nanoparticles are replaced with lanthanum hexaboride nanoparticles (with an average particle size of 20 nm).

Example 33

Example 30 is repeated except the clear annealed float glass plate substrate is replaced with a biaxially oriented poly(ethylene terephthalate) film substrate (6 inches by 12 inches by 4 mils thick (0.004 inch)).

Example 34

Example 31 is repeated except the clear annealed float glass plate substrate is replaced with a flame treated biaxially oriented poly(ethylene terephthalate) film substrate (6 inches by 12 inches by 4 mils thick (0.004 inch)).

Example 35

Example 32 is repeated except the clear annealed float glass plate substrate is replaced with a poly(allyl amine)-primed biaxially oriented poly(ethylene terephthalate) film substrate (6 inches by 12 inches by 4 mils thick (0.004 inch))

Example 36

A twisted nematic film precursor solution, formulated such that the cured multilayer film has a reflection bandwidth greater than 100 nm is made using the following process. Four coating solutions are made by combining compounds 1 and 2 in the ratios indicated in Table 3. Cellulose acetobutyrate in a concentration of 0.8% by weight based on the cholesteric mixture is added to each solution employed in order to improve layering, and the solutions are dissolved in butyl acetate. 2,4,6-Trimethylbenzoyidiphenylphosphine oxide as photoinitiator is added to each solution in a concentration of 1.5% by weight, based on the cholesteric mixture. Each solution is applied with a doctor blade in a wet-film thickness of 30 micrometers and crosslinked photochemically using an UV light source prior to the application of a subsequent layer. In this example, the multilayer stack is coated onto an near infrared absorptive glass plate substrate (6 inches by 12 inches by 2.5 mm thick).

TABLE 3

| Solution number | Compound 1 | Compound 2 |
|---|---|---|
| 1 | .973 | .027 |
| 2 | .976 | .024 |

TABLE 3-continued

| Solution number | Compound 1 | Compound 2 |
|---|---|---|
| 3 | .979 | .021 |
| 4 | .982 | .018 |

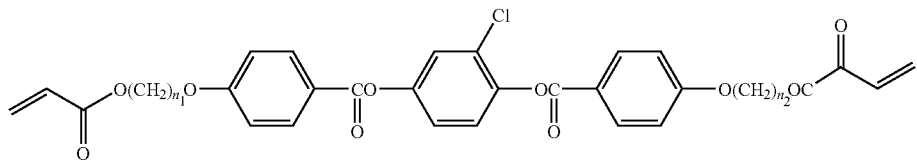

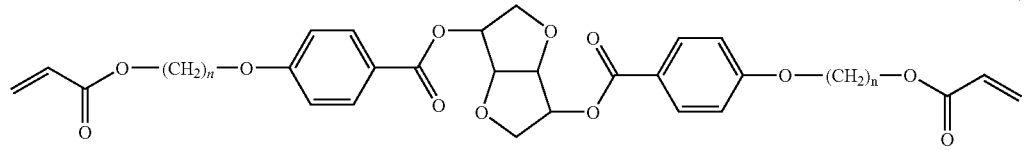

Example 37

Example 36 is repeated except the near infrared absorptive glass plate substrate is replaced with a Solex® green glass plate substrate (6 inches by 12 inches by 2.5 mm thick).

Example 38

Example 36 is repeated except the near infrared absorptive glass plate substrate is replaced with a biaxially oriented poly(ethylene terephthalate) film substrate (6 inches by 12 inches by 4 mils thick (0.004 inch)) which incorporates a phthalocyanine-type near infrared absorbent material.

Example 39

Example 36 is repeated except the near infrared absorptive glass plate substrate is replaced with an near infrared absorbent flame treated biaxially oriented poly(ethylene terephthalate) film substrate (6 inches by 12 inches by 4 mils thick (0.004 inch)).

Example 40

Example 36 is repeated except the near infrared absorptive glass plate substrate is replaced with a poly(allyl amine)-primed biaxially oriented poly(ethylene terephthalate) film substrate (6 inches by 12 inches by 4 mils thick (0.004 inch)) which incorporates a mixture of three different phthalocyanine-type near infrared absorbent materials to provide an absorptive bandwidth of greater than 100 nm.

Example 41

Example 36 is repeated except the near infrared absorptive glass plate substrate is replaced with a Raybarrier® TFI-5063N film (6 inches by 12 inches, a product of the Sumitomo Osaka Cement Company, Ltd., Chiba, Japan), coated with antimony tin oxide contained within a binder.

Example 42

Example 36 is repeated except the near infrared absorptive glass plate substrate is replaced with a Soft Look® UV/IR 25 film (6 inches by 12 inches, a product of the Tomoegawa Company), coated with indium tin oxide contained within a binder.

Example 43

Example 36 is repeated except the near infrared absorptive glass plate substrate is replaced with a "KH" film (6 inches by 12 inches, a product of the Sumitomo Metal Mining Company), coated with lanthanum hexaboride contained within a binder.

Example 44

Antimony tin oxide nanoparticles (with an average particle size of 10 nm) are added to a twisted nematic film precursor solution. The twisted nematic film precursor solution is formulated and processed such that the resulting solid twisted nematic film reflects right handed circularly polarized light with a reflection bandwidth greater than 100 nm is coated onto a clear annealed float glass plate substrate (6 inches by 12 inches by 2.5 mm thick).

Example 45

Indium tin oxide nanoparticles (with an average particle size of 20 nm) are added to a twisted nematic film precursor solution. The twisted nematic film precursor solution is formulated and processed such that the resulting solid twisted nematic film reflects left handed circularly polarized light with a reflection bandwidth greater than 100 nm is coated onto a clear annealed float glass plate substrate (6 inches by 12 inches by 2.5 mm thick).

Example 46

Lanthanum hexaboride nanoparticles (with an average particle size of 20 nm) are added to a twisted nematic film precursor solution. The twisted nematic film precursor solution is formulated and processed such that the resulting solid twisted nematic film reflects right handed circularly polarized light with a reflection bandwidth greater than 100 nm is coated onto a clear annealed float glass plate substrate (6 inches by 12 inches by 2.5 mm thick). Subsequently, on top of the free surface of the above described right handed twisted nematic layer is coated a twisted nematic film precursor solution, formulated and processed such that the resulting solid twisted nematic film reflects left handed circularly polarized light and has a reflection bandwidth greater than 100 nm.

Example 47

Antimony tin oxide nanoparticles (with an average particle size of 10 nm) are added to a twisted nematic film precursor solution. The twisted nematic film precursor solution is formulated and processed such that the resulting solid twisted nematic film reflects right handed circularly polarized light with a reflection bandwidth greater than 100 nm is coated onto a biaxially oriented poly(ethylene terephthalate) film substrate (6 inches by 12 inches by 4 mils thick (0.004 inch)).

Example 48

Indium tin oxide nanoparticles (with an average particle size of 20 nm) are added to a twisted nematic film precursor solution. The twisted nematic film precursor solution is formulated and processed such that the resulting solid twisted nematic film reflects left handed circularly polarized light with a reflection bandwidth greater than 100 nm is coated onto a flame treated biaxially oriented poly(ethylene terephthalate) film substrate (6 inches by 12 inches by 4 mils thick (0.004 inch)).

Example 49

Lanthanum hexaboride nanoparticles (with an average particle size of 20 nm) are added to a twisted nematic film precursor solution. The twisted nematic film precursor solution is formulated and processed such that the resulting solid twisted nematic film reflects right handed circularly polarized light with a reflection bandwidth greater than 100 nm is coated onto a poly(allyl amine)-primed biaxially oriented poly(ethylene terephthalate) film substrate (6 inches by 12 inches by 4 mils thick (0.004 inch)). Subsequently, on top of the free surface of the above described right handed twisted nematic layer is coated a twisted nematic film precursor solution, formulated and processed such that the resulting solid twisted nematic film reflects left handed circularly polarized light and has a reflection bandwidth greater than 100 nm.

Example 50

A twisted nematic film precursor solution, formulated and processed such that the resulting solid twisted nematic film reflects right handed circularly polarized light with a reflection bandwidth greater than 100 nm is coated onto an near infrared absorptive glass plate substrate (6 inches by 12 inches by 2.5 mm thick).

Example 51

A twisted nematic film precursor solution, formulated and processed such that the resulting solid twisted nematic film reflects left handed circularly polarized light with a reflection bandwidth greater than 100 nm is coated onto a Solex® green glass plate substrate (6 inches by 12 inches by 2.5 mm thick).

Example 52

A twisted nematic film precursor solution, formulated and processed such that the resulting solid twisted nematic film reflects right handed circularly polarized light with a reflection bandwidth greater than 100 nm is coated onto a biaxially oriented poly(ethylene terephthalate) film substrate (6 inches by 12 inches by 4 mils thick (0.004 inch)) which incorporates a phthalocyanine-type near infrared absorbent material. Subsequently, on top of the free surface of the above described right handed twisted nematic layer is coated a twisted nematic film precursor solution, formulated and processed such that the resulting solid twisted nematic film reflects left handed circularly polarized light and has a reflection bandwidth greater than 100 nm.

Example 53

A twisted nematic film precursor solution, formulated and processed such that the resulting solid twisted nematic film reflects right handed circularly polarized light with a reflection bandwidth greater than 100 nm is coated onto an near infrared absorbent flame treated biaxially oriented poly(ethylene terephthalate) film substrate (6 inches by 12 inches by 4 mils thick (0.004 inch)).

Example 54

A twisted nematic film precursor solution, formulated and processed such that the resulting solid twisted nematic film reflects left handed circularly polarized light with a reflection bandwidth greater than 100 nm is coated onto a poly(allyl amine)-primed biaxially oriented poly(ethylene terephthalate) film substrate (6 inches by 12 inches by 4 mils thick (0.004 inch)) which incorporates a mixture of three different phthalocyanine-type near infrared absorbent materials to provide an absorptive bandwidth of greater than 100 nm.

Example 55

A twisted nematic film precursor solution, formulated and processed such that the resulting solid twisted nematic film reflects right handed circularly polarized light with a reflection bandwidth greater than 100 nm is coated onto a Raybarrier® TFI-5063N film (6 inches by 12 inches, a product of the Sumitomo Osaka Cement Company, Ltd., Chiba, Japan), coated with antimony tin oxide contained within a binder. Subsequently, on top of the free surface of the above described right handed twisted nematic layer is coated a twisted nematic film precursor solution, formulated and processed such that the resulting solid twisted nematic film reflects left handed circularly polarized light and has a reflection bandwidth greater than 100 nm.

Example 56

A twisted nematic film precursor solution, formulated and processed such that the resulting solid twisted nematic film reflects right handed circularly polarized light with a reflection bandwidth greater than 100 nm is coated onto a Soft Look® UV/IR 25 film (6 inches by 12 inches, a product of the Tomoegawa Company), coated with indium tin oxide contained within a binder.

Example 57

A twisted nematic film precursor solution, formulated and processed such that the resulting solid twisted nematic film reflects left handed circularly polarized light with a reflection bandwidth greater than 100 nm is coated onto a "KH" film (6 inches by 12 inches, a product of the Sumitomo Metal Mining Company), coated with lanthanum hexaboride contained within a binder.

Example 58

Antimony tin oxide nanoparticles (with an average particle size of 10 nm) are added to a twisted nematic film precursor solution. The twisted nematic film precursor solution is formulated and processed such that the resulting solid twisted nematic film reflects right handed circularly polarized light is coated onto a Wave Retarder Film half wave film substrate from International Polarizer, Inc. Marlborough, Mass. (6 inches by 12 inches by 4 mils thick (0.004 inch)).

Example 59

Indium tin oxide nanoparticles (with an average particle size of 20 nm) are added to a twisted nematic film precursor solution. The twisted nematic film precursor solution is formulated and processed such that the resulting solid twisted nematic film reflects left handed circularly polarized light is coated onto a Wave Retarder Film half wave film substrate from International Polarizer, Inc. Marlborough, Mass. (6 inches by 12 inches by 4 mils thick (0.004 inch)).

Example 60

Lanthanum hexaboride nanoparticles (with an average particle size of 20 nm) are added to a twisted nematic film precursor solution. The twisted nematic film precursor solution is formulated and processed such that the resulting solid twisted nematic film reflects right handed circularly polarized light is coated onto a Wave Retarder Film half wave film substrate from International Polarizer, Inc. Marlborough, Mass. (6 inches by 12 inches by 4 mils thick (0.004 inch)). Subsequently, on top of the free surface of the above described half wave film is coated a twisted nematic film precursor solution, formulated and processed such that the resulting solid twisted nematic film reflects right handed circularly polarized light.

Example 61

Indium tin oxide nanoparticles (with an average particle size of 20 nm) are added to a twisted nematic film precursor solution. The twisted nematic film precursor solution is formulated and processed such that the resulting solid twisted nematic film reflects left handed circularly polarized light is coated onto a Wave Retarder Film half wave film substrate from International Polarizer, Inc. Marlborough, Mass. (6 inches by 12 inches by 4 mils thick (0.004 inch)). Subsequently, on top of the free surface of the above described right handed twisted nematic layer is coated a twisted nematic film precursor solution, formulated and processed such that the resulting solid twisted nematic film reflects left handed circularly polarized light.

Example 62

Antimony tin oxide nanoparticles (with an average particle size of 10 nm) are added to a twisted nematic film precursor solution. The twisted nematic film precursor solution is formulated and processed such that the resulting solid twisted nematic film reflects right handed circularly polarized light with a reflection bandwidth greater than 100 nm is coated onto a Wave Retarder Film half wave film substrate from International Polarizer, Inc. Marlborough, Mass. (6 inches by 12 inches by 4 mils thick (0.004 inch)). Subsequently, on top of the free surface of the above described half wave film is coated a twisted nematic film precursor solution, formulated and processed such that the resulting solid twisted nematic film reflects right handed circularly polarized light with a reflection bandwidth greater than 100 nm.

Example 63

A quaterrylenetetracarboxylic diimide near infrared absorber dye is added to a twisted nematic film precursor solution. The twisted nematic film precursor solution is formulated and processed such that the resulting solid twisted nematic film reflects left handed circularly polarized light with a reflection bandwidth greater than 100 nm is coated onto a Wave Retarder Film half wave film substrate from International Polarizer, Inc. Marlborough, Mass. (6 inches by 12 inches by 4 mils thick (0.004 inch)). Subsequently, on top of the free surface of the above described half wave film is coated a twisted nematic film precursor solution, formulated and processed such that the resulting solid twisted nematic film reflects left handed circularly polarized light with a reflection bandwidth greater than 100 nm.

Examples 64-107

The films from Examples 4-6, 9-15, 18-23, 27-29, 33-35, 38-43, 47-49 and 52-63 are coated on either surface with Gelva 263 with added UV absorber (a proprietary pressure sensitive adhesive product containing a UV absorber commercially available from the Solutia Company) to provide an adhesive layer thickness of about 6 to 10 microns. The adhesive coated surfaces are covered with a paper release film.

The paper release film may be removed and the resultant solar control window films may be affixed to automotive glass or to architectural glass.

Examples 108-114

The coated glass of Examples 1, 7, 17, 26, 32, 44, and 50 are used directly as solar control automotive glass or to architectural glass.

Examples 115-121

The coated glass of Examples 2, 8, 24, 30, 36, 45, and 51 are used as components within solar control automotive glass laminates or to architectural glass laminates through the processes described above.

Examples 122-127

The coated glass of Examples 3, 16, 25, 31, 37, and 46 are used as components within solar control architectural glass E-glass constructs.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A composition for reducing the transmission of near infrared radiation comprising:
    (a) a nonmicellar twisted nematic liquid crystal having cholesteric near infrared-reflecting properties; and
    (b) at least one near infrared absorptive material.
2. The composition of claim 1, wherein the at least one near infrared absorptive material is dispersed within the nonmicellar twisted nematic liquid crystal.

3. The composition of claim 1, having a reflective bandwidth greater than 100 nm.

4. The composition of claim 1, wherein the nonmicellar twisted nematic liquid crystal has an absorptive bandwidth greater than 100 nm.

5. The composition of claim 1, wherein the near infrared absorptive material comprises near infrared absorptive inorganic nanoparticles.

6. The composition of claim 5, wherein the near infrared absorptive inorganic nanoparticles comprise metals, compounds containing metals, composites containing metals, or mixtures thereof, and wherein the metal is selected from the group consisting of tin, zinc, zirconium, iron, chromium, cobalt, cerium, indium, nickel, silver, copper, platinum, manganese, tantalum, tungsten, vanadium, antimony, lanthanum and molybdenum.

7. The composition of claim 6, wherein the near infrared absorptive material comprises near infrared absorptive inorganic nanoparticles selected from the group consisting of antimony-doped tin oxide, tin-doped indium oxide, lanthanum hexaboride and mixtures thereof.

8. The composition of claim 1 further comprising a matrix material.

9. The composition of claim 8, wherein the near infrared absorptive material comprises near infrared absorptive inorganic nanoparticles.

10. The composition of claim 9, wherein the near infrared absorptive inorganic nanoparticles comprise metals, compounds containing metals, composites containing metals, or mixtures thereof, and wherein the metal is selected from the group consisting of tin, zinc, zirconium, iron, chromium, cobalt, cerium, indium, nickel, silver, copper, platinum, manganese, tantalum, tungsten, vanadium, antimony, lanthanum and molybdenum.

11. The composition of claim 10, wherein the near infrared absorptive inorganic nanoparticles are selected from the group consisting of antimony-doped tin oxide, tin-doped indium oxide, lanthanum hexaboride and mixtures thereof.

12. A near infrared reflecting layer comprising the composition of claim 1.

13. The near infrared reflecting layer of claim 12, wherein the composition comprises near infrared absorptive inorganic nanoparticles.

14. The composition of claim 13, wherein the near infrared absorptive inorganic nanoparticles comprise metals, compounds containing metals, composites containing metals, or mixtures thereof, and wherein the metal is selected from the group consisting of tin, zinc, zirconium, iron, chromium, cobalt, cerium, indium, nickel, silver, copper, platinum, manganese, tantalum, tungsten, vanadium, antimony, lanthanum and molybdenum.

15. The composition of claim 14, wherein the near infrared absorptive layer comprises near infrared absorptive inorganic nanoparticles selected from the group consisting of antimony-doped tin oxide, tin-doped indium oxide, lanthanum hexaboride and mixtures thereof.

16. A solar control window film comprising the composition of claim 1.

17. A solar control window film comprising the near infrared reflecting layer of claim 12.

18. A solar control glass laminate comprising the composition claim 1.

19. The solar control glass laminate comprising the near infrared reflecting layer of claim 12.

* * * * *